UNITED STATES PATENT OFFICE.

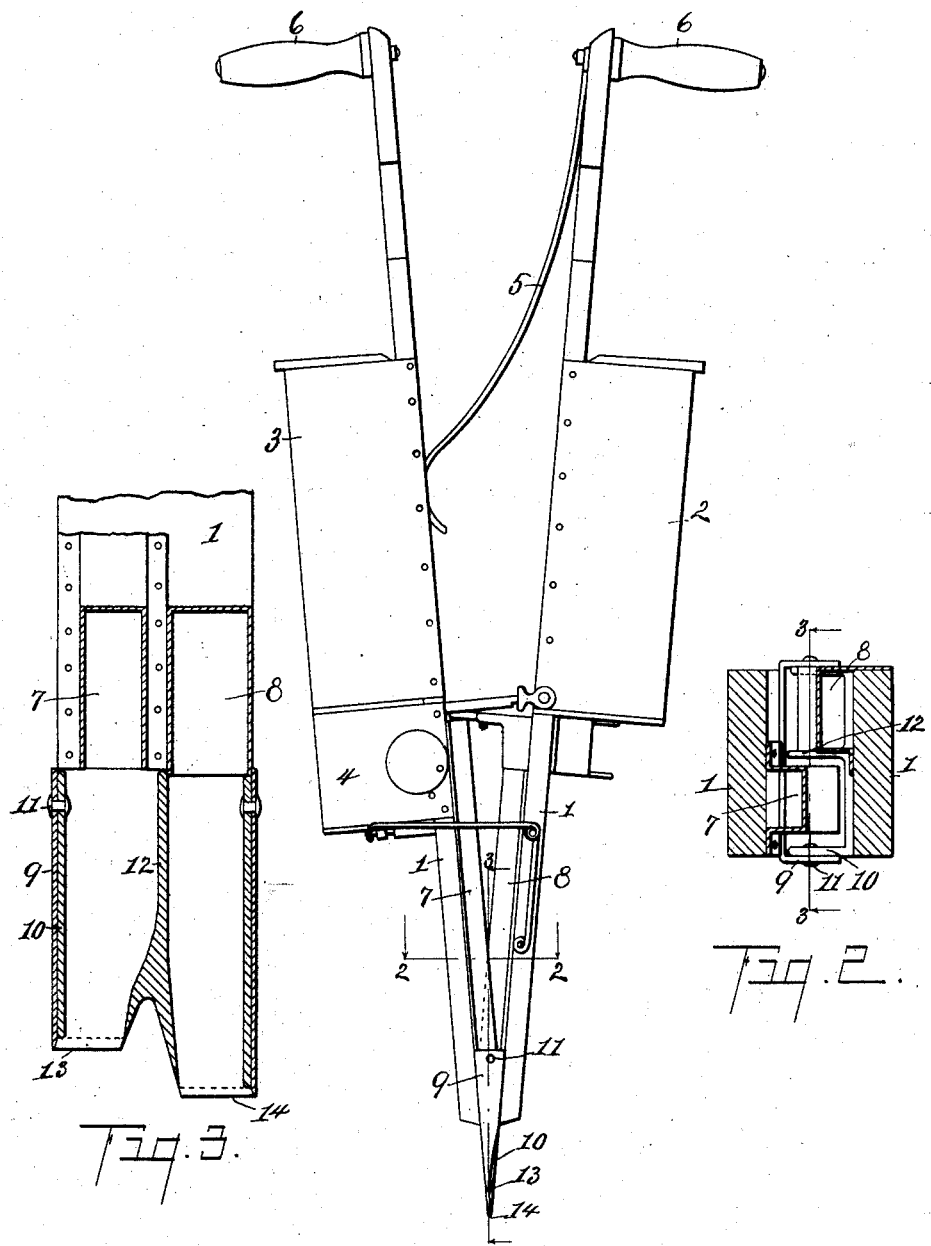

GEORGE S. SHEFFIELD, OF BURR OAK, MICHIGAN, ASSIGNOR TO SHEFFIELD MANUFACTURING COMPANY, OF BURR OAK, MICHIGAN.

COMBINED PLANTER AND FERTILIZER-DISTRIBUTER.

No. 883,493.　　　　　Specification of Letters Patent.　　Patented March 31, 1908.

Application filed October 20, 1906, Serial No. 339,834. Renewed February 24, 1908. Serial No. 417,395.

*To all whom it may concern:*

Be it known that I, GEORGE S. SHEFFIELD, a citizen of the United States, residing at Burr Oak, county of St. Joseph, and State of Michigan, have invented certain new and useful Improvements in a Combined Planter and Fertilizer-Distributer, of which the following is a specification.

This invention relates to improvements in planters.

My improvements relate particularly to an improved combination hand planter and fertilizer distributer.

The main object of this invention is, to provide an improved combination planter and fertilizer distributer in which the fertilizer is delivered so that it does not come in direct contact with the seeds and in position to be most available to the plant.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which, Figure 1 is a side elevation of my improved planter. Fig. 2 is an enlarged cross section thereof taken on a line corresponding to line 2—2 of Fig. 1. Fig. 3 is an enlarged detail vertical section taken on a line corresponding to line 3—3 of Figs. 1 and 2.

In the drawing, the sectional views are taken looking in the direction of the little arrows at the ends of the section lines.

Similar reference characters refer to similar parts throughout the several views.

Referring to the drawing, I provide a pair of pivoted bars or "staffs" as they are sometimes called, on which the hoppers 2, 3 and 4 are mounted. The hopper 2, in the structure illustrated, is a fertilizer hopper; the hopper 3 is a seed hopper, the same being designed for such seed as corn, beans and the like; and the hopper 4 is a pumpkin or squash seed hopper. Each hopper is provided with a suitable dropping mechanism, but as the details of these mechanisms form no part of this invention, they are not here illustrated.

The hopper 2 is provided with a delivery chute leading therefrom to the delivery blade, and the hoppers 3 and 4 are provided with a delivery chute 7 also leading to the delivery blade. The delivery blade, which is adapted to open the ground for the seeds and fertilizer and deposit the same thereon, preferably consists of a pair of plates 9 and 10 which are secured to the lower end of the staffs, said plates being provided with inwardly projecting telescoping flanges at their edges. These flanges are inclined so that the plates form a flat blade or point at their lower ends. The lower end of the blade is preferably bifurcated, the points 13 and 14 being of different lengths.

The bars are preferably secured together by pivots 11 arranged through the flanges of the blade plates. Thus arranged, when the upper ends of the bars are brought together, the delivery blade is opened. The delivery blade is held normally closed by the spring 5 arranged between the upper ends of the bars. The bars are provided with laterally projecting handles 6 which are grasped by the operator in use. The plate 10 is preferably provided with a vertical rib 12, which divides the delivery blade into two conduits. The chute 7 is arranged to deliver to one of these conduits, and the chute 8 to the other.

The hoppers are provided with suitable dropping mechanism but, as the same form no part of this invention, they are not here illustrated. This dropping mechanism is preferably arranged to be operated by the operation of the bars, which operation, at the same time, opens and closes the delivery blade. By this arrangement, at each operation of the device, the delivery blade is opened to deliver the seed and fertilizer and the dropping mechanisms are actuated. By arranging the delivery blade as I have illustrated and described, the fertilizer is delivered and placed in relation to the seeds so as to be most accessible thereto.

It is found, in practice, that where the seed and fertilizer, such as phosphate and the like, are delivered together, the phosphate is likely to "burn" the germinating seed. By my improved planter, they are dropped at the same time, but the seed is protected from the fertilizer by a layer of earth, so that the "burning" does not take place. The fertilizer is also delivered in a plane somewhat below the seed so that it is readily and quickly reached by the roots of the plant.

I have illustrated and described my improved combined planter and fertilizer distributer in detail in the form preferred by me on account of its structural simplicity, economy, convenience and durability in use. I am, however, aware that it is capable of considerable variation in structural details without departing from my invention.

Having thus described my invention, what I claim as new and desire to secure by Letters Patent is:

1. In a combined planter and fertilizer distributer, the combination of a pair of pivotally connected bars having handles thereon; a bifurcated blade therefor, one point of which extends below the other, said blade consisting of two plate-like members secured to said bars, said members having telescoping flanges on their edges, and one of said members being provided with a vertical rib dividing said delivery blade into conduits leading to its said points; hoppers carried by said bars; and delivery chutes leading from said hoppers to the said conduits in said delivery blade, for the purpose specified.

2. In a combined planter and fertilizer distributer, the combination of a pair of pivotally connected bars having handles thereon; a bifurcated blade therefor, said blade consisting of two plate-like members secured to said bars, said members having telescoping flanges on their edges, and one of said members being provided with a vertical rib dividing said delivery blade into conduits leading to its said points; hoppers carried by said bars; and delivery chutes leading from said hoppers to the said conduits in said delivery blade, for the purpose specified.

3. In a combined planter and fertilizer distributer, the combination of a pair of pivotally connected bars having handles thereon; a bifurcated blade therefor, one point of which extends below the other, said blade consisting of two plate-like members secured to said bars, said blade having conduits leading to its said points; hoppers carried by said bars; and delivery chutes leading from said hoppers to the said conduits in said delivery blade, for the purpose specified.

4. In a combined planter and fertilizer distributer, the combination of a pair of pivotally connected bars having handles thereon; a bifurcated blade therefor, said blade consisting of two plate-like members secured to said bars, said blade having conduits leading to its said points; hoppers carried by said bars; and delivery chutes leading from said hoppers to the said conduits in said delivery blade, for the purpose specified.

5. In a combined planter and fertilizer distributer, the combination of a bifurcated delivery blade, one point of which extends below the other, said delivery blade having conduits leading to its said points; seed and fertilizer hoppers; and delivery chutes leading from said hoppers to the said conduits in said delivery blade, for the purpose specified.

6. In a combined planter and fertilizer distributer, the combination of a bifurcated delivery blade, said delivery blade having conduits leading to its said points; seed and fertilizer hoppers; and delivery chutes leading from said hoppers to the said conduits in said delivery blade, for the purpose specified.

7. In a combined planter and fertilizer distributer, the combination of a delivery blade, having two conduits therein; seed and fertilizer hoppers; and delivery chutes leading from said hoppers to the said conduits in said delivery blade, for the purpose specified.

In witness whereof, I have hereunto set my my hand and seal in the presence of two witnesses.

GEORGE S. SHEFFIELD. [L. S.]

Witnesses:
CLAYTON D. HIMEBAUGH,
ROYAL A. WILCOX.